United States Patent [19]
MacKay

[11] Patent Number: 5,831,391
[45] Date of Patent: Nov. 3, 1998

[54] TIMER CONTROLLED OUTDOOR GROUND LIGHTING SYSTEM WITH INTRUDER DETECTION

[76] Inventor: Iain N. B. MacKay, R.R. #2, Beeton, Ontario, Canada, L0G 1A0

[21] Appl. No.: 757,333

[22] Filed: Nov. 27, 1996

Related U.S. Application Data

[63] Continuation-in-part of Ser. No. 516,191, Aug. 17, 1995, abandoned.

[51] Int. Cl.$^6$ .................................................... H05B 37/00
[52] U.S. Cl. ............................ 315/159; 250/342; 340/565
[58] Field of Search .................................... 340/565, 567; 315/149, 159, 150, 151, 156, 157, 360, 362; 250/342

[56] References Cited

U.S. PATENT DOCUMENTS

| | | |
|---|---|---|
| 4,305,021 | 12/1981 | Schreiden . |
| 4,843,283 | 6/1989 | Chen . |
| 4,876,487 | 10/1989 | Yang ........................................ 315/362 |
| 4,906,901 | 3/1990 | Carroll . |
| 5,015,994 | 5/1991 | Hoberman et al. . |
| 5,099,402 | 3/1992 | Starniri . |
| 5,113,303 | 5/1992 | Herres . |
| 5,136,213 | 8/1992 | Sacchetti . |
| 5,258,899 | 11/1993 | Chen . |
| 5,282,118 | 1/1994 | Lee . |
| 5,293,097 | 3/1994 | Elwell . |
| 5,357,170 | 10/1994 | Luchaco et al. . |
| 5,371,489 | 12/1994 | Carroll et al. . |
| 5,442,177 | 8/1995 | Boulos et al. . |

*Primary Examiner*—Benny Lee
*Assistant Examiner*—David H. Vu
*Attorney, Agent, or Firm*—Trevor C. Klotz

[57] ABSTRACT

An outdoor ground lighting system that includes one or more low voltage lamp units, provided from a step down transformer connectable to a high voltage AC power supply and an on/off timer operative to turn the lamps on for a selected time period during hours of darkness. Added to this known system is a secondary switching system that includes a solenoid operated switch connected to bypass the timer and a detector to detect the presence of a person or the like in the field of view of the detector. The detector provides an output signal in response to detecting the presence of someone and the solenoid switch is actuated by such signal to switch on the lamps when the timer is in the off cycle. The secondary switching system enhances the garden lighting system by providing a security lighting system when the timer is in an off mode.

5 Claims, 2 Drawing Sheets

TIMER CONTROLLED OUTDOOR GROUND LIGHTING SYSTEM WITH INTRUDER DETECTION

RELATED APPLICATION

This application is a Continuation-In-Part of U.S. application Ser. No. 08/516,191 filed Aug. 17, 1995 now abandoned.

FIELD OF THE INVENTION

The present invention relates generally to timer controlled outdoor ground lighting systems and more particularly to enhancement of such systems to turn on, or turn up the intensity of, the lamps of the system when in the off cycle of operation when the presence of an intruder, such as a human being or the like warm blooded animal, is detected.

BACKGROUND OF INVENTION

Outdoor ground lighting systems are in common use for aesthetic purposes around residences and many are timer controlled (mechanical or electronic timer) to be on for variously adjustable selected periods of time during hours of darkness. The lamps of the outdoor lighting units operate at low voltage converted by suitable means such as transformers from the normal 120VAC or 240VAC power supply. These known outdoor lighting systems also provide a certain element of security by illuminating dark areas during the selected period of time, but not thereafter. In the known systems the lamps of the lighting units are either off (no intensity) or on (full intensity).

In addition to outdoor lighting systems, many households further have intruder detection systems that illuminate a selected area upon detection of an intruder. The sensors are normally passive infrared detectors (PID). These thermal electric infrared optical sensors provide a signal to turn on the lights upon detection of an intruder in a known manner.

SUMMARY OF THE INVENTION

A principle object of the present invention is to provide enhancement of outdoor ground lighting systems so that they operate, during an off period, as a security lighting system to illuminate the area in which they are located upon detection of an intruder.

A further object of the present invention is to provide, as in the foregoing, a dual function outdoor ground lighting system, i.e. aesthetic lighting and security, but in which during dusk to dawn, the lamps, during the timer "off" cycle, are illuminated for only a fraction of their full intensity. The motion sensor still activates full light intensity upon detection of an intruder in the area scanned by the motion detector.

In accordance with the present invention there is particularly provided improvements in an outdoor ground lighting system that includes at least one lamp unit, a step down transformer or the like to provide a low voltage supply for the lamp of said lamp unit, and an on/off timer operative to turn the lights on for selected time periods during hours of darkness, the improvement comprising a secondary switching system having a normally open switch shunted across the timer controlled switch which is in the circuit of the high voltage supply to said step down transformer and detector means to detect the presence of an intruder, said secondary switching system including a second step down transformer with circuit means operative in response to an output signal from said detector means resulting from the presence of the intruder in the field of view of the detector that scans said selected area to switch said lamps to full intensity when said timer is in the off cycle. The detector means may be a motion sensor, a sound activated sensor or a heat sensor, i.e. a passive infrared detector.

BRIEF DESCRIPTION OF THE DRAWINGS

The invention is illustrated by way of example in the accompanying drawings wherein.

DESCRIPTION OF PREFERRED EMBODIMENT

Figure 1:
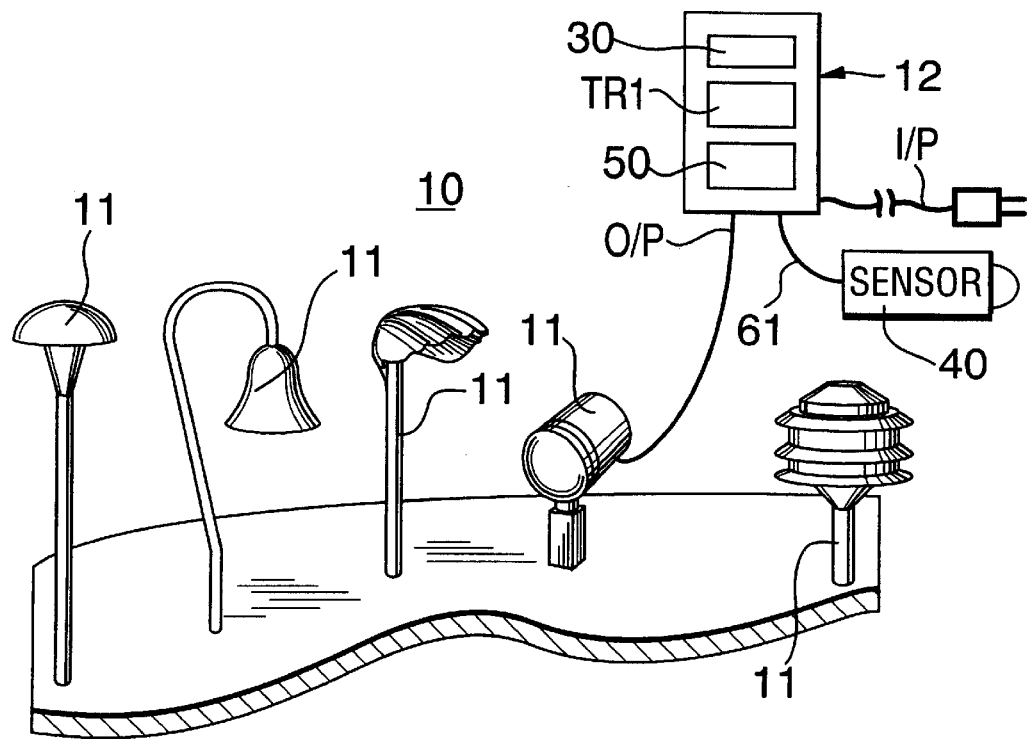
FIG. 1 is a diagrammatic view of a decorative ground lighting system and schematic of the step down transformer timer and secondary switching therefore, the latter being provided in accordance with the present invention.

Referring to the drawings, there is diagrammatically illustrated in FIG. 1 a decorative garden lighting system that includes a light source 11 comprising a number of spaced apart lamp units or fixtures located in a garden area to illuminate the same during selected periods of darkness and a control unit 12.

The control unit 12 includes a timer 30 for selecting on/off periods of operation and a step down transformer TR1 to provide low voltage to the lamps via output line O/P. An input line I/P plugs into a high voltage AC power supply 20 of 120 or 240 volts. This is conventional in the art.

In accordance with the present invention, the above system is enhanced by providing means to bypass the timer and turn on the lights, or to full intensity as the case may be, during the timer "off" period when the presence of a person or like warm blooded animal has been detected. The system can be used to illuminate a walkway facilitating entry of an occupant's late arrival into his own residence as well as act as a security measure against intruders.

The system enhancement means includes a detector 40 and circuitry in a unit 50 located in the control unit 12. The detector 40 may for example be a thermo electric infrared optical sensor also referred to as a passive infrared detector (PID) and is suitably mounted and located to provide a field of view of the desired area. In a prototype system applicant used a detector model NW-12 from Apek Secure Lite Co. Ltd. located in Taiwan. The detector 40 can be mounted on one of the lamp units or mounted as a separate unit at a suitable location. A sensor activated by sound or motion could be used in place of or in addition to the infrared sensor.

Figure 2:
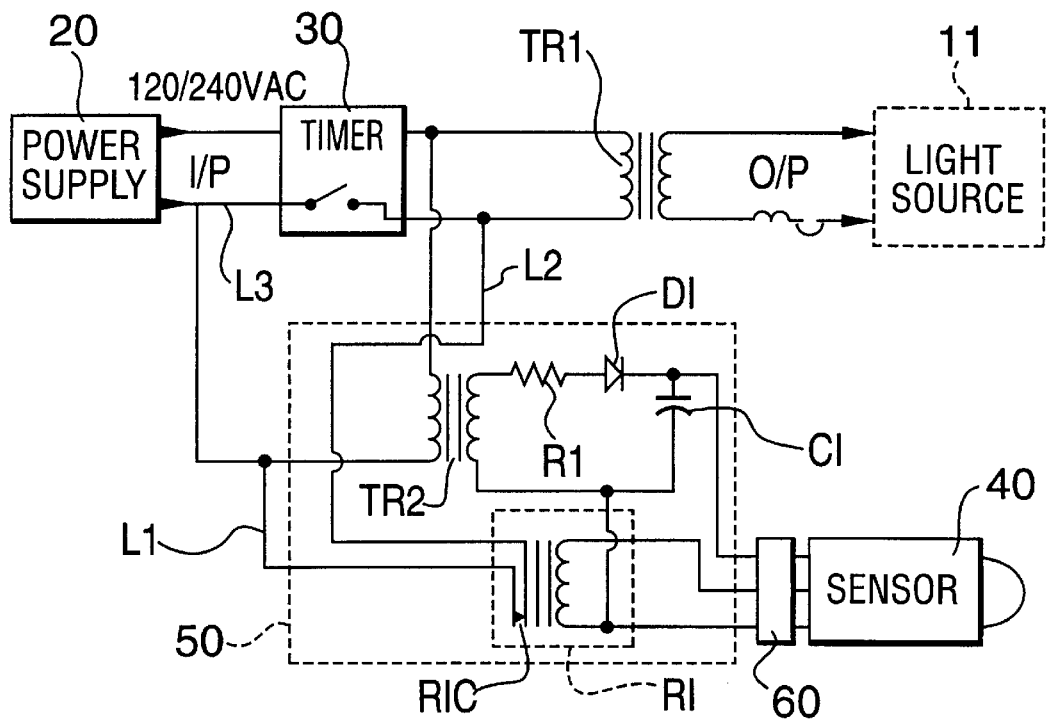
FIG. 2 is a circuit diagram for the ground lighting system of FIG. 1 incorporating a secondary switching system to bypass the timing device.

The circuitry of unit 50 in FIG. 2 consists of a second step down transformer TR2, a resistor R1, a diode DI, a capacitor CI and a relay RI. The transformer TR2 transforms the 120 (or 240) VAC supply to 12 (or 24) VAC. Resistor R1, diode DI and capacitor CI rectify this voltage which supplies the sensor 40 with 12 or 24 volt DC as the case may be. This voltage is isolated from the main power line by the transformer TR2 and is inherently safe from major shocks. In applicant's prototype transformer TR2 functionally replaced the transformer in the above mentioned detector NW-12.

The sensor 40 upon detecting the presence of a human or animal, provides an output signal that causes activation of the relay RI causing contacts RIC to close. The contacts are a normally open switch in the circuit of leads L1 and L2 that are connected to line L3 of the supply to bypass the on/off contacts of timer 30. The lights thus turn on during the off cycle of the timer when the sensor 40 detects the presence of a person (or animal) or moving object in the case of a motion sensor.

The transformer TR2, resistor R, diode DI, capacitor CI and the relay RI are a separate potted unit located in the housing of the control unit as is illustrated in FIG. 1 and mentioned above. A separate plug 60 and cable 61 connect to the control unit and carry the low voltage to the sensor 40 together with the return "on" signal to the relay.

The foregoing provides not only an energy saving "on/off" aesthetic garden and/or walkway lighting system, but also one which provides the dual function of security lighting of dark areas during the timer "off" period of the system.

A conventional system with the timer set to turn the lights on at 8:00 p.m. and off at 11:30 p.m. would leave the homeowner returning at 1:00 a.m. in the dark, but with the present system, the sensor would detect the human presence and activate the lighting system thus providing a safe lit area to the doorway.

A conventional system with the timer set to turn the lights on at 8:00 p.m. and off at 11:30 p.m. provides illuminated security only for those hours. With the present apparatus, the sensor would activate the lighting system if an intruder should attempt to take advantage of an unlit area.

However, because the present system allows both light fixtures and the secondary switching system to operate on low voltage, the system now becomes far less expensive to install and operate than a conventional 120V system. It also, because of low voltage is not required to meet the same installation standards and mandatory inspection that a 120V system is required to do. This will enable the system to have many dedicated security functions not incorporated with landscape lighting. For instance, an out building not equipped with electrical power can be supplied with low voltage lighting and a low voltage sensor to provide security lighting or convenience lighting. To do this with conventional 120V power would require: (a) a permit; (b) cable buried 4 feet below grade inside a conduit; (c) exterior wiring above ground around the outbuilding protected by conduit; (d) final inspection and approval.

With the low voltage system, there is no need to bury the cable, place it in conduit, nor apply for permit or inspection.

The present invention involves two known arts. One, the transformer control, the other, human presence detectors (passive infrared, etc.) and allows them to be combined in an unique and useful manner.

Figure 3:
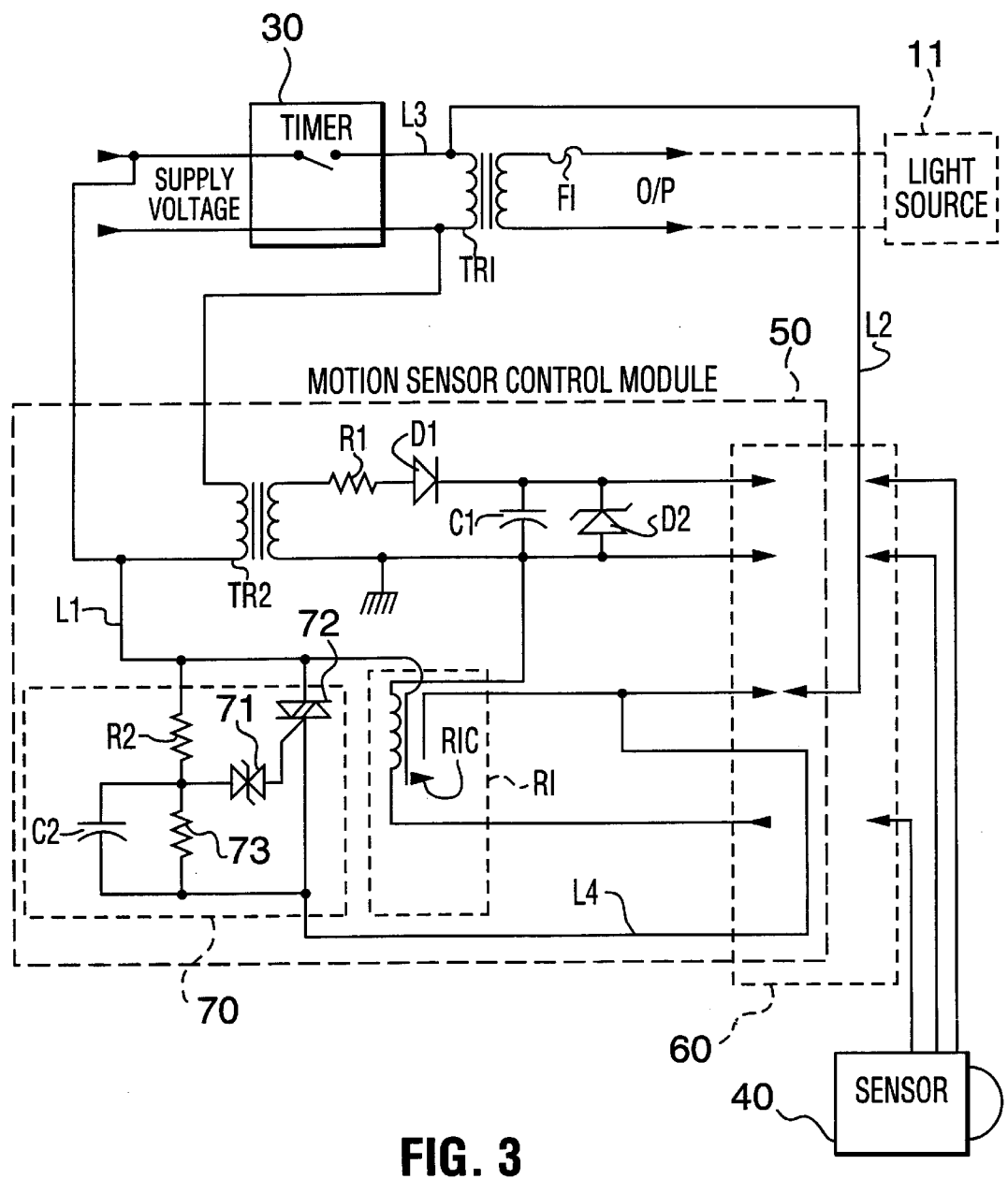
FIG. 3 is a circuit diagram functionally equivalent to that of FIG. 2 but incorporating additional circuitry such that during dusk to dawn the lamps emit partial intensity during the timer "off" cycle.

FIG. 3 is a circuit diagram in which the lamps of the light source 11, in the timer "off" cycle, are on but only for a fraction of their full intensity. In FIG. 3 resistor R1 is an optional regulatory resistor. Diode D1 is a rectifier diode and in conjunction with capacitor C1 and a Zener diode D2 supply direct current to the motion sensor 40 and a controlled voltage to the relay RI.

When the motion sensor 40 sends an "on" signal the relay will close the contacts RIC and bypass the timer 30 to turn the lights on for a predetermined time which time is adjustable by the operator.

In FIG. 3 there is an additional option provided for the lighting system by the circuit designated generally by the reference 70 and referred to herein as a triac circuit. The triac circuit 70 has circuit line L4 shunted across the relay contacts RIC and in series with line L4 is a gated switch 72 commonly known as a triac. A resistor R2, in series with a light dependent resistor 73, is shunted across the triac. One side of a diac 71 is connected intermediate resistor R2 and the light dependent resistor 73 and the other side is connected to the base of the triac. A capacitor C2 is connected in parallel with the light responsive resistor 73.

The circuit 70 provides for low intensity lighting during the timer "off" cycle between dusk and dawn. Depending upon the light dependent resistor 73 and resistor R2 combination, the resistor R2 and capacitor C2 and the diac 71 will apply a portion of the AC voltage to transformer TR2 and will supply a proportional voltage to the light sources. The Motion Sensor will still activate full light intensity when an intruder is detected but during the timer "off" cycle the lights will be "on" and illuminated only for a fraction of their full intensity.

Optionally there is a fuse F1 in the transformer output O/P to the light source 11.

I claim:

1. An outdoor yard lighting system comprising a plurality of low voltage lamp units, a first step down transformer means for supplying said lamp units with low voltage from a common residential high AC voltage supply, timer controlled switch means in the high voltage circuit connected to said first step down transformer means and operable to turn the lamp units on and off for selected periods of time and a secondary switching system having a normally open switch shunted across said timer controlled switch means, detector means to detect the presence of an intruder in a selected area, said detector means providing an output signal upon detection of the intruder in said selected area, said secondary switching system comprising a second step down transformer with a high voltage side thereof connected to said AC voltage supply and circuit means and a relay connected to a low voltage side of said second step down transformer to close said normally open switch in response to an output signal from said detector means.

2. An outdoor yard lighting system as defined in claim 1, including a second circuit means having a triac shunted across said normally open switch to illuminate said lamps only to a fraction of their full intensity during the timer "off" cycle of operation.

3. An outdoor yard lighting system as defined in claim 2, wherein said triac circuit includes a triac, resistor means including a light dependent resistor shunted across said triac, a capacitor shunted across said light dependent resistor and a diac interposed between said triac and said light dependent resistor.

4. An improved outdoor ground lighting system that includes at least one lamp unit, a first step down transformer connectable to a high voltage AC power supply to provide a low voltage supply for the lamp of said lamp unit, and an on/off timer operative to turn the lamp on for a selected time period during hours of darkness, the improvement comprising detector means to detect the presence of a person in the field of view of the detector and provide an output signal in response to such detection and a secondary switching system operatively responsive to said output signal to switch on said lamp when said timer is in the off cycle, said timer controlling an on/off switch to the high voltage side of said first transformer and wherein said secondary switching system includes a second step down transformer and a relay operated normally open switch, said normally open switch being shunted across said timer controlled on/off switch, said relay of said normally open switch being connected to a low voltage side of said second transformer and wherein said detector output signal is operatively associated with said relay to close said normally open switch in response to an output signal from the detector.

5. An improved outdoor ground lighting system as defined in claim 4, including a system control housing and wherein said step down transformers, timer and secondary switching system are mounted in said housing.

* * * * *